April 10, 1962 C. E. GINGHER ETAL Re. 25,156

WARDROBE RACK

Original Filed Sept. 17, 1956 4 Sheets-Sheet 1

INVENTORS
CARL E. GINGHER
CARL E. GINGHER, Jr

BY Taulmin & Taulmin

Attorneys

WARDROBE RACK

Original Filed Sept. 17, 1956 4 Sheets-Sheet 2

INVENTORS
CARL E. GINGHER
CARL E. GINGHER, Jr.
BY
Taulmin & Taulmin
Attorneys

WARDROBE RACK

Original Filed Sept. 17, 1956 4 Sheets-Sheet 3

INVENTORS
CARL E. GINGHER
BY CARL E. GINGHER, Jr
Taulmin & Taulmin
Attorneys

WARDROBE RACK

Original Filed Sept. 17, 1956 4 Sheets-Sheet 4

INVENTORS
CARL E. GINGHER
BY CARL E. GINGHER, Jr.
Taulmin & Taulmin
Attorneys

United States Patent Office

Re. 25,156
Reissued Apr. 10, 1962

25,156
WARDROBE RACK

Carl E. Gingher and Carl E. Gingher, Jr., Scranton, Pa., assignors to Gingher Manufacturing Company, Scranton, Pa., a corporation of Pennsylvania Original No. 2,875,904, dated Mar. 3, 1959, Ser. No. 610,232, Sept. 17, 1956. Application for reissue Mar. 3, 1961, Ser. No. 93,833
10 Claims. (Cl. 211—148)

Matter enclosed in heavy brackets [ ] appears in the original patent but forms no part of this reissue specification; matter printed in italics indicates the additions made by reissue.

This invention relates to a wardrobe rack, and more particularly a wardrobe rack unit or valet which is readily assembled or disassembled and capable of a plurality of different arrangements dependent upon the situs of installation.

It is the principal object of this invention to provide a wardrobe rack assembled from components which readily adapt the rack to be used in various arrangements.

It is another object of this invention to provide a basic wardrobe rack unit having interchangeable components which may be readily assembled into a permanent installation for factory locker rooms, hotels, schools, theaters, sports arenas, and other places, for gatherings of people where it is desirable to provide space for hats, coats and the like.

It is a further object of this invention to provide a rack for permanent installation which is rigid and sturdy yet may be readily assembled or disassembled by relatively unskilled labor in a short period of time.

It is an additional object of this invention to provide a basic rack unit having interchangeable components which give the rack a versatility wherein the rack unit may readily fit in any available space regardless of the shape of the space.

Other objects and advantages of this invention will become apparent upon reference to the accompanying description when taken in conjunction with the following drawings wherein.

Figure 1:
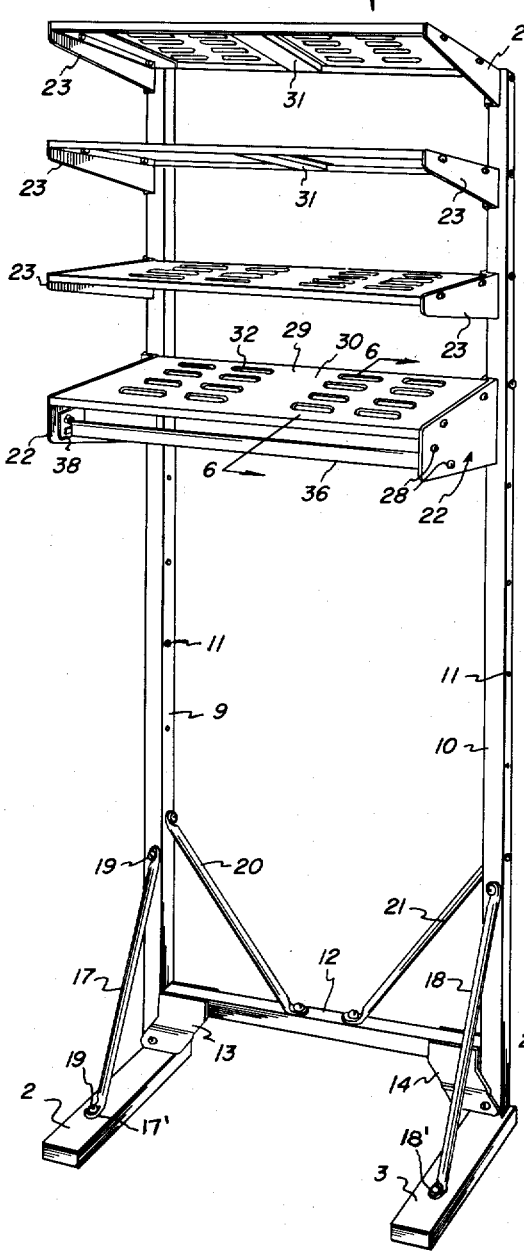
FIGURE 1 is an overall perspective view of the basic wardrobe rack unit of this invention.
Figure 2:
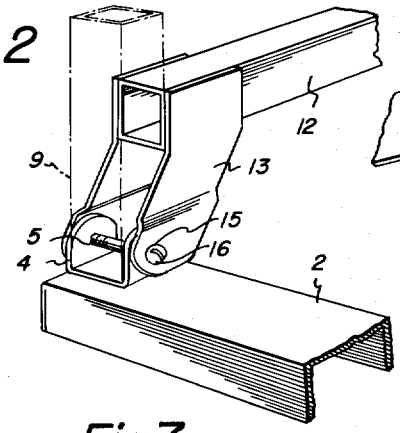
FIGURE 2 is a perspective view, on an enlarged scale, showing the assembly of the base leg, the vertical column and the crossbrace of the rack in FIGURE 1.
Figure 3:
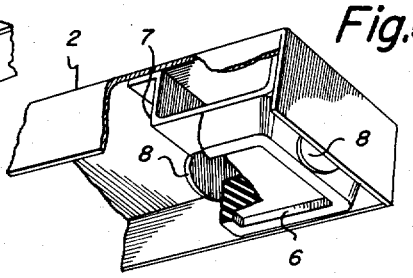
FIGURE 3 is a perspective view of the underside of the base leg showing a resilient cushion block mounted therein.

Returning now to the drawings, and more particularly to FIGURE 1 wherein like references indicate the same parts throughout the several views, 1 indicates generally the basic wardrobe rack unit of this invention. The unit comprises a pair of spaced base legs 2 and 3 which are in the form of channel members having closed ends, as shown. A pair of spaced ears 4, as shown in FIGURE 2, are spot welded adjacent one end of each of the base legs. There are opposed holes 5 in each of the spaced ears.

There is a resilient supporting block 6 of rubber attached to the undersurface of each of the base legs adjacent each end thereof. The rubber block 6 is supported in a block support 7 which has a pair of spaced projections 8 to grip the sides of the rubber block 6. The support 7 is spot welded to the base leg.

If desired, casters may be substituted for the rubber cushion blocks to impart mobility to the rack unit.

Tubular vertical posts 9 and 10, which have square cross sections, have their lower ends inserted between the ears 4 on each of the base legs 2 and 3. Each of the posts has a plurality of spaced apertures 11 extending therethrough.

A tubular crossbrace 12, also having a square cross section, interconnects the base legs 2 and 3. Spaced plates which form offset hinges 13 and 14 are attached to each end of the crossbrace 12. As may be better seen in FIGURE 2, the offset hinges 13 and 14 extend downwardly and outwardly with respect to the end of the crossbrace 12. At the ends there are opposed holes 15 adjacent the ends of the offset hinges 13 and 14 which overlap the ears 4, as shown in greater detail in FIGURE 2. Bolts 16 are then inserted through the respective holes in the offset hinges, the spaced ears, and the lower end of the vertical column to secure these three components together.

Reinforcing rods 17 and 18 interconnect each of the base legs 2 and 3 with the respective vertical columns 9 and 10. The reinforcing rods are hollow tubular members having flattened ends 17' and 18' with holes therethrough. Reinforcing rods are secured in position by suitable screws 19 inserted through the holes in the flat ends thereof and threadedly received within the respective components of the rack unit.

Similar reinforcing rods 20 and 21 brace the vertical posts 9 and 10 with the crossbrace 12.

Spaced along the upper ends of each of the vertical posts 9 and 10 are a plurality of shelf-supporting brackets. The lowermost of these brackets, indicated as 22, are somewhat different from the remaining brackets indicated as 23. All of the brackets are formed of relatively thin sheet metal and taper outwardly from their outer end toward the inner end which is secured to the vertical post.

Figure 4:
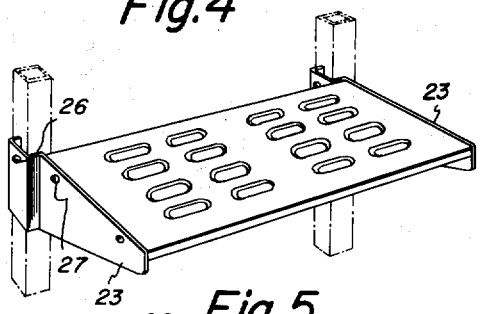
FIGURE 4 is an overall perspective view, in enlarged scale, of one of the upper shelves and the brackets supporting the same showing the manner in which the brackets are positioned on the vertical columns.

The lowermost bracket 22 comprises a tapering bracket arm 24 whose wider end is integral with the socket 25. The socket 25 has a shape to conform closely to the contour of the vertical columns, such as may be seen in FIGURES 1, 4 and 5. This socket extends halfway around the vertical column, as may be clearly seen in FIGURE 4, so as to enable the bracket arm to protrude from the center of its respective vertical column. There is a hole 26 through each of the bracket sockets. In addition, there is a plurality of horizontally spaced holes 27, adjacent the top edge of each of the bracket arms. The lowermost bracket only has a pair of holes 28 adjacent the front edge thereof for supporting a hanger bar.

The remaining brackets 23 are similar in all respects to the lowermost bracket 22 except that the bracket arm is narrower and the two hanger holes adjacent the front edge of the bracket arm are omitted.

Figure 6:
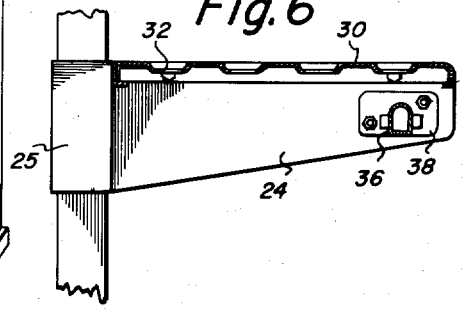
FIGURE 6 is a sectional view taken along the lines 6—6 of FIGURE 1 to show the shape of the openings in the shelves to secure additional reinforcing.

Supported between brackets mounted in the same vertical positions on the vertical posts are a plurality of shelves 29. The shelves 29 are all similar and each comprises a supporting surface 30 which is reinforced by a transverse brace 31 which may be clearly seen in the uppermost shelf shown in FIGURE 1. There are a plurality of spaced openings 32 in the supporting surface. The edges of the openings 32 are substantially Z-shaped, as may be more clearly seen in FIGURE 6. This shape serves to reinforce the shelf supporting surface.

Figure 5:
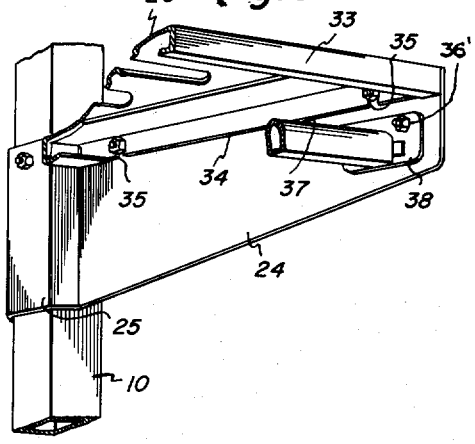
FIGURE 5 is a perspective view of the underside of one end of the lowermost shelf of the rack in FIGURE 1, in enlarged scale, to illustrate the attachment of the shelves to the brackets and the attachment of the hanger to the lowermost bracket members.

The longitudinal edges of each of the shelves 29 are rolled at 33 and shown in FIGURE 5. The transverse ends of the shelves are bent downwardly at 34 as also shown in FIGURE 5. There are downwardly-opening slots 35 in each of the end bent portions 34. The slots 35 are spaced to correspond with the horizontally spaced holes 27 in the brackets. To secure a shelf to a bracket, it is only necessary to insert a nut-and-bolt assembly through the bracket holes and then slide the shelf slots 35 down around the holes. Thus, in order to assemble or disassemble the shelves from the bracket, it is not necessary to completely remove the bolts from the brackets.

A hanger bar 36, which comprises an elongated tubular member having a rounded top surface 37, has transverse flat plates 38 spot welded to each end thereof. Each of the plates 38 has openings therethrough which are spaced to register with the holes 28 adjacent the front edge of the lowermost bracket 22. Thus, the hanger bar 36 is supported between the lowermost bracket 22 by conventional nut-and-bolt assemblies 36' as shown in FIGURE 5.

If desired, a plurality of individual hanger clips may be spaced upon the hanger bar 36. These clips may comprise a loop portion which fits over the hanger bar and a hook portion to receive the hook of the individual coat hanger.

The entire assembly of the basic wardrobe unit 1, as described above, is assembled through the use of nuts and bolts. All of the components are fabricated from sheet steel of a suitable gage. Consequently, when the unit is assembled, the result is a permanent installation which is rigid and sturdy. However, if desired, the unit may be readily disassembled for removal or change of location.

The utility of the unit may be further increased by providing a suitable umbrella rack between the vertical posts 9 and 10 immediately above the crossbrace 12 in place of the reinforcing rods 20 and 21.

The shelves and crossbrace are made in different lengths, such as two, three and four-foot. Consequently, merely by replacing the shelves and crossbrace, it is easy to obtain wardrobe rack units of varying lengths. This feature readily adapts the rack unit to fit the space provided therefor.

The components from which the basic wardrobe rack is fabricated permit the rack to be utilized in a variety of arrangements, each of which will be discussed presently in detail.

Figure 7:
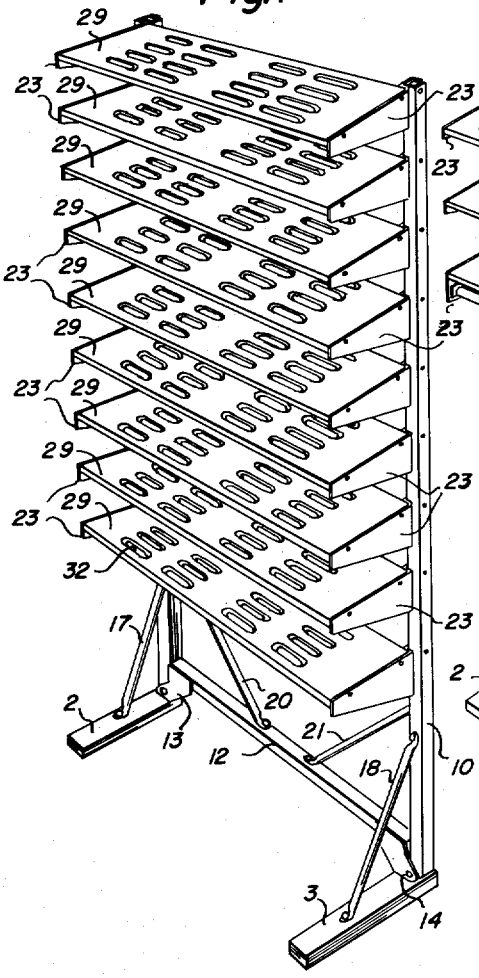
FIGURE 7 is a modification of the basic wardrobe rack unit disclosed in FIGURE 1 showing the rack unit adapted to be used solely as a hatrack.

FIGURE 7 discloses a modification wherein the rack unit is to be used solely as a hat rack. This is achieved merely by securing brackets along the full length of the vertical columns, as shown in FIGURE 7. Additional shelves are then secured between the additional brackets. This arrangement requires no parts other than those previously described in connection with the wardrobe rack unit in FIGURE 1.

Figure 8:
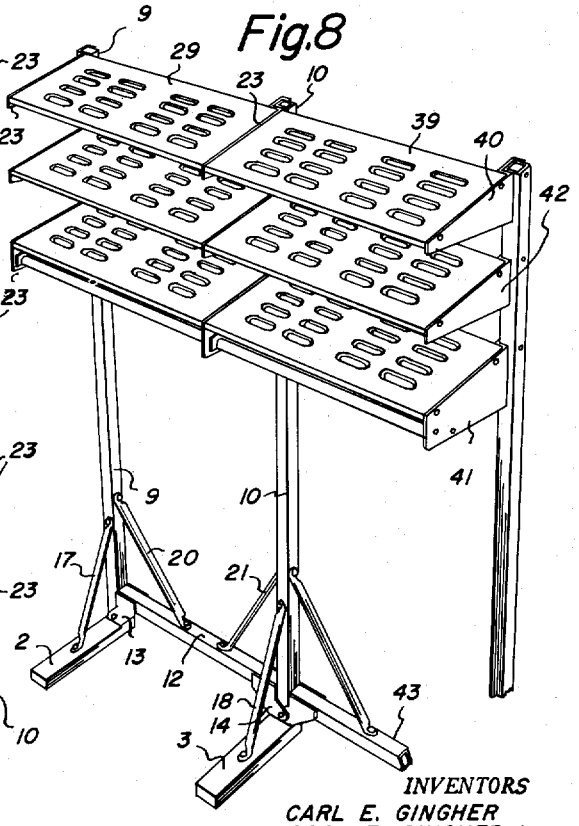
FIGURE 8 is another modification of the rack unit illustrated in FIGURE 1 showing the manner in which an extension may be attached to the basic unit.

FIGURE 8 illustrates an arrangement whereby the basic unit is lengthened by providing an extension thereto. This extension comprises additional shelves 39 which are similar to the shelves previously described. One end of each of the shelves is secured to the brackets of the basic unit and the other end of the shelves secured to similar brackets 40 and 41 which correspond to the brackets 23 and lowermost bracket 22 previously described. The brackets 40 and 41 are attached to a vertical column 42 which is mounted upon a conventional base leg interconnected with the basic rack unit by a crossbrace 43. Thus, in order to increase the capacity of the base unit, it is not necessary to employ an additional unit but merely to attach additional shelves to the basic unit and support these shelves in the manner as described.

Figure 9:
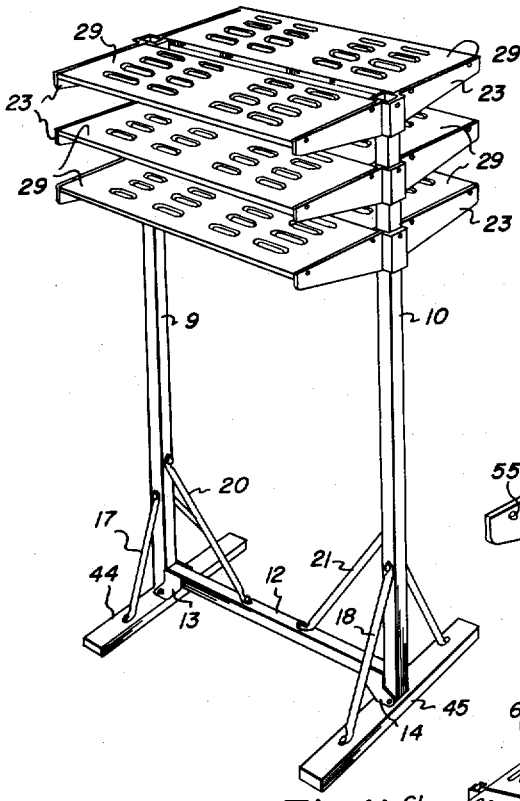
FIGURE 9 is another modification of the basic rack unit wherein a back-to-back arrangement is achieved.
Figure 10:
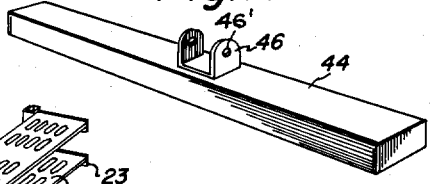
FIGURE 10 is a perspective view looking downwardly on the base leg utilized in the modification of FIGURE 9.

FIGURE 9 illustrates a back-to-back arrangement of the basic wardrobe unit of this invention which is adapted for installation in the interior of space. This arrangement permits access to both sides of the rack. This modification is achieved by supporting the vertical columns 9 and 10 upon base legs 44 and 45 which are shown in greater detail in FIGURE 10. Base leg 44 comprises a channel formed from sheet steel having the ends thereof closed. Spaced ears *46*, having opposed holes [46] *46'*, are spot welded to the center of the upper surface of the base leg. Thus, when the vertical columns are secured to the spaced ears, the result is as illustrated in FIGURE 9.

The brackets, which are similar to the brackets previously described, have their sockets both attached to sides of the column, as shown in FIGURE 9. Thus, two brackets are attached at the same vertical height to each vertical column, with the brackets extending transversely from the column in opposite directions. A single bolt secures both sockets in position.

Figure 11:
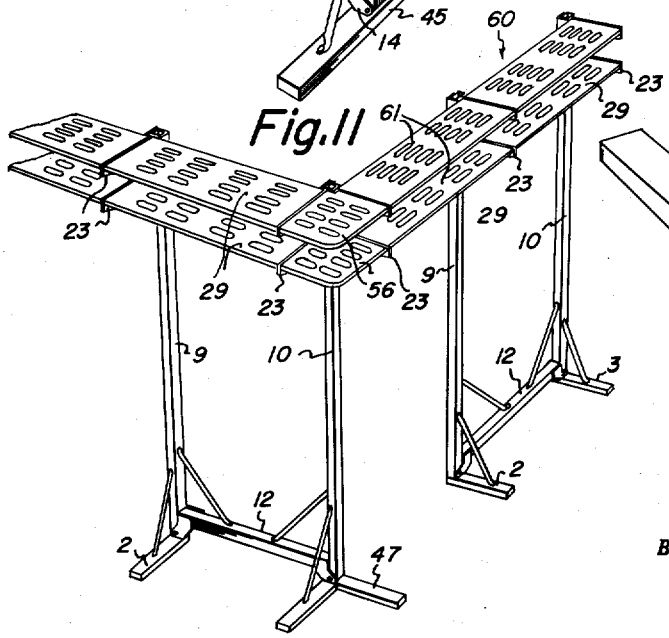
FIGURE 11 is another modification of the basic rack unit showing the unit employed in an outside corner arrangement.
Figure 12:
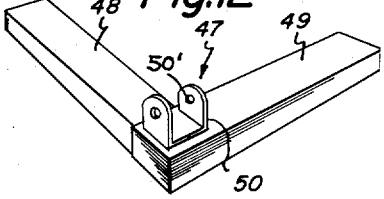
FIGURE 12 is a perspective view looking downwardly upon the base member employed in the modification of FIGURE 11.

Proceeding next to FIGURE 11, the basic unit is shown as employed in an outside corner arrangement. In this arrangement, the vertical columns 9 and 10 are respectively connected to a base leg 2 and to a base member 47. The base member 47 is shown in greater detail in FIGURE 12, and comprises two intersecting base legs 48 and 49 which are similar to the base legs 2 and 3. The base legs 48 and 49 are rigidly welded at right angles to form the base member 47. A set of spaced ears 50 having opposed holes 50' is connected to the upper surface of the base member 47 at the apex thereof.

Figure 13:
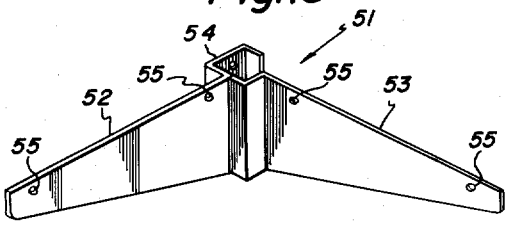
FIGURE 13 is a perspective view of the bracket used at the corner in the arrangement shown in FIGURE 11.

Mounted adjacent to the upper end of the vertical column 10 is a bracket 51 which, as may be seen in FIGURE 13, comprises bracket arms 52 and 53 extending at right angles from a socket 54. Each of the bracket arms 52 and 53 is so mounted on the socket 54 that they extend from the center of the vertical column when the bracket is in position. Each of the bracket arms has horizontally spaced holes 55 adjacent the top edge thereof for use in supporting the shelves.

Figure 14:
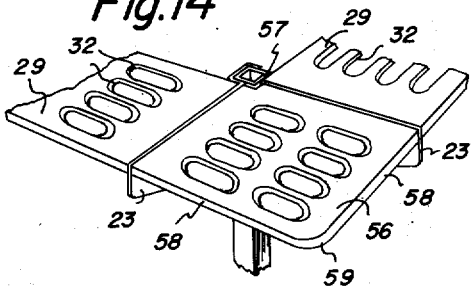
FIGURE 14 is a perspective view in an enlarged scale looking down at the corner of the modification in FIGURE 11 to show the details of the outside corner shelf.

An outside corner shelf 56 is provided to be supported from the bracket 51. The shelf 56, illustrated in greater detail in FIGURE 14, is formed similarly to the other shelves but is substantially square and has its inner corner notched at 57. All the edges of the shelves are bent downwardly at 58. The outer corner of the shelf is rounded at 59. There are holes in the two intersecting bent edges which cooperate with the horizontal holes on the bracket arms.

As may be seen in FIGURE 11, a complete basic wardrobe unit 60 is positioned at right angles to the first unit and is spaced therefrom. Additional shelves 61 interconnect the bracket arms of the special bracket 51 with the bracket of the unit 60.

Figure 15:
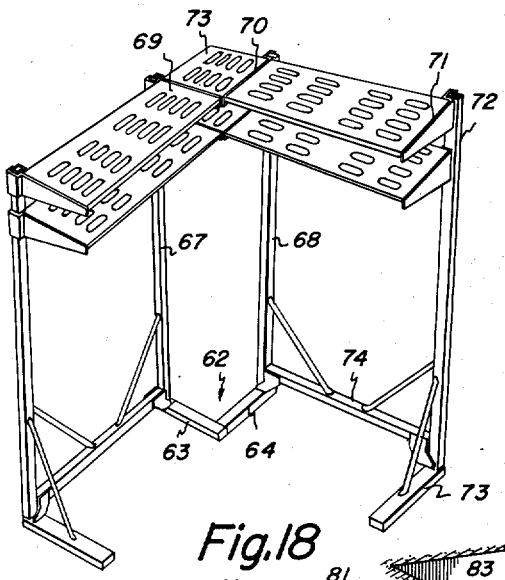
FIGURE 15 is a perspective view of another modification of the basic rack unit wherein the unit is employed in an inside corner arrangement.
Figure 16:
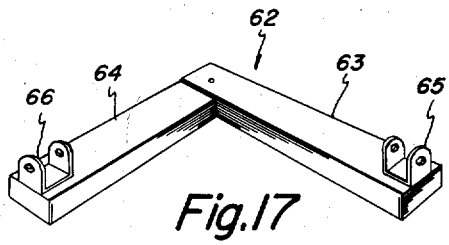
FIGURE 16 is a perspective view looking downwardly on the base member employed in the modification of FIGURE 15.

Another modification of this invention is the inside corner wardrobe rack arrangement which is shown in FIGURE 15. This arrangement comprises a base member 62, as illustrated on an enlarged scale in FIGURE 16, and having intersecting base legs 63 and 64. Spaced ears 65 and 66 are placed adjacent the ends of each of the legs 63 and 64.

Vertical columns 67 and 68 are attached to each of the base legs 63 and 64 in the manner previously described. Brackets 69 and 70 are positioned adjacent the upper ends of the vertical columns.

The remainder of this arrangement is similar to the basic rack unit and comprises shelves supported between brackets wherein one pair of brackets are mounted on a vertical column which is secured to a base leg by brackets 71 mounted adjacent the upper end of column 72 which are secured to a conventional base leg 73. A crossbrace 74 interconnects the base leg 73 with the legs 63 and 64 of the base member 62.

Figure 17:
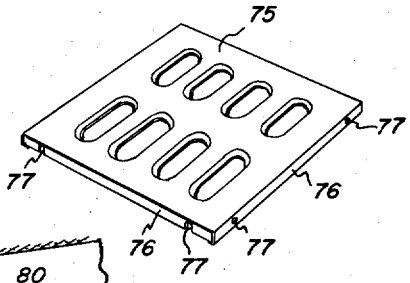
FIGURE 17 is an oversall perspective view looking down upon the inside corner shelf used in the arrangement of FIGURE 15.

An inside corner shelf 75 is provided which is substantially square and has downwardly turned edges 76. As may be more clearly shown in FIGURE 17, the intersecting inner edges of the corner shelf have slots 77 therein which cooperate with the horizontally spaced openings in the brackets. The shelf 75 is secured between the bracket arms 69 and 70 in a manner as previously described to result in the arrangement as indicated in FIGURE 15.

Figure 18:
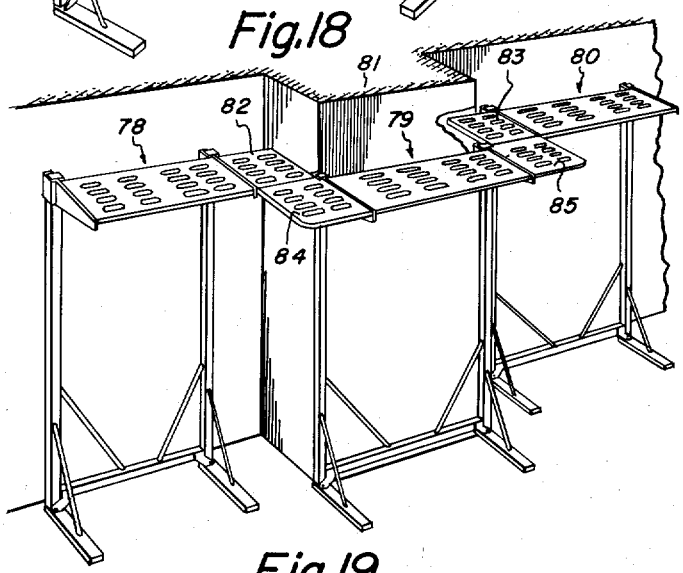
FIGURE 18 is another modification of the basic rack unit wherein the rack is adapted to go around columns or other obstructions in the area wherein it is desired to install the wardrobe rack.

The flexibility of the wardrobe rack of this invention is further demonstrated in FIGURE 18 where the unit is assembled against a wall but is adapted to accommodate columns or other obstructions which may be encountered in the wall surface. This arrangement comprises a plurality of basic wardrobe rack units 78, 79 and 80 which are interconnected so as to go around a column 81. This arrangement is obtained by connecting an inside corner shelf 82 to the end of the unit 78. An inside corner shelf 83 is also attached to the end of the unit 80. Outside corner shelves 84 and 85 are secured to both ends of the rack unit 79. The assembly is completed by connecting each of the outside corner shelves to the inside corner shelves 82 and 83, respectively, by passing bolts through the cooperating slots in the bent portions of each of the shelves. The result is a rigid and sturdy arrangement which is illustrated in FIGURE 18.

Figure 19:
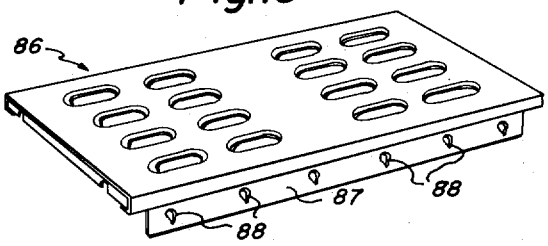
FIGURE 19 is an overall perspective view of a shelf which may be used between the lowermost brackets to eliminate the use of the hanger bar.

FIGURE 19 illustrates a modified shelf 86 which may be mounted between the lowermost brackets of any of the basic wardrobe rack units. This shelf is similar to the conventional shelves except that a depending hanger member 87 is spot-welded to the underside of the shelf. A plurality of holes 88 are spaced in the hanger member. The holes 88 accommodate the hooks of coat hangers. By assigning each of these hook openings a reference symbol, which corresponds with reference symbols assigned to spaces upon the shelves, an easy method is provided whereby coats and hats upon the basic rack unit are readily matched.

Thus, it can be seen that this invention provides a basic wardrobe rack unit which is extremely versatile, in that it may be assembled in a variety of variations dependent upon the space where the rack is to be permanently installed. The rack is sturdy, light in weight, yet is readily assembled or disassembled with all the components secured by nuts and bolts.

It will be understood that this invention is susceptible to modification in order to adapt it to different usages and conditions, and, accordingly, it is desired to comprehend such modifications within this invention as may fall within the scope of the appended claims.

What is claimed is:

1. In a wardrobe rack unit, a pair of substantially parallel base members positioned upon a surface, a pair of spaced ears upstanding from each of said base members adjacent the ends thereof, vertical members having their lower ends secured between the spaced ears of each of the said base members, a cross brace having spaced plates extending outwardly and downwardly from each end thereof, said spaced plates receiving said vertical members therebetween and secured to said spaced ears, means for bracing said vertical members by said cross brace, a bracket having one end thereof shaped to conform to the outline of said vertical member, said shaped end extending halfway around said vertical member when in position thereon, and shelf means connected between brackets mounted on each of said vertical members.

2. A wardrobe rack unit especially adapted for permanent installation in a number of arrangements and comprising a plurality of horizontal base means, said base means having at least one pair of spaced ears upstanding therefrom, a cross brace reinforcing said base means and having offset plates at each end thereof extending outwardly and downwardly and connected to said spaced ears, a vertical column upstanding from each pair of said spaced ears and connected thereto, means for bracing said vertical members by said cross brace, said column having a plurality of spaced apertures therethrough, a bracket formed from relatively thin sheet material and having one end thereof bent to conform closely to the contour of said columns and to extend halfway around said column when in position thereon, means securing said brackets to said column whereby said brackets extend laterally therefrom, and shelf means detachably mounted between said brackets.

3. A wardrobe rack unit especially adapted for permanent installation in a number of arrangements and comprising a first horizontal base leg, a second horizontal base member having a pair of base legs intersecting at right angles with one of said intersecting legs being spaced from said first base leg and parallel thereto, said first base leg having a pair of spaced ears upstanding adjacent one end thereof, said second base member having a pair of spaced ears upstanding from the intersection of its component legs, a cross brace connected between the spaced ears of each of the spaced members, a vertical column upstanding from each pair of said spaced ears and connected thereto, a first bracket formed from relatively thin sheet material and having one end thereof bent to conform closely to the contour of said column and to extend one-half of the way around the column upstanding from said first base member, a second bracket formed from relatively thin sheet material and having a socket for closely receiving one of said vertical columns, said second bracket having supporting arms extending from said socket at right angles to each other, means securing each of said brackets to said columns whereby said bracket arms extend transversely therefrom and are substantially parallel to the base legs of the respective base members, shelf means detachably mounted between said first brackets and the parallel bracket supporting arm, second shelf means mounted between said right-angle-bracket supporting arms, additional shelf means extending from the other of said bracket supporting arms, and means supporting said additional shelf means in a substantially horizontal plane.

4. A wardrobe rack unit especially adapted for permanent installation in a number of arrangements and comprising a plurality of horizontal base means with one of said base means comprising a base member having a pair of base legs intersecting at right angles, a pair of spaced ears upstanding on the extreme ends of each of said intersecting base legs, the remaining base member comprising additional base legs on either side of said intersecting base legs spaced therefrom and being parallel thereto, a cross brace having spaced plates on the end thereof extending outwardly and downwardly connecting each of said base legs with the adjacent one of the intersecting legs of said base member by attachment of said spaced plates to said spaced ears, a vertical column upstanding from each pair of said spaced ears and connected thereto, means bracing said vertical members by said cross braces, a plurality of brackets each formed from relatively thin sheet material and having one end thereof bent to closely conform to the contour of said column to extend halfway around said column when positioned thereon, means securing said brackets to said columns whereby said brackets extend transversely therefrom substantially parallel to the base legs directly below, a substantially square shelf member detachably mounted between the brackets attached to the columns upstanding from said intersecting base legs, and additional shelf means detachably mounted between the spaced parallel brackets.

5. A wardrobe rack unit especially adapted for permanent installation in a number of arrangements and comprising a plurality of spaced horizontal base legs arranged in substantially parallel relationship, each of said base legs having a pair of spaced ears upstanding from the corresponding ends thereof, a cross brace interconnecting adjacent base legs and having spaced offset plates at each end thereof extending outwardly and downwardly and secured to said spaced ears, a vertical column upstanding from each pair of said spaced ears and connected thereto but between said cross-piece offset plates, means for bracing said vertical members by said cross brace, a plurality of brackets each formed of relatively thin sheet material and having one end thereof bent to conform closely to the contour of said column to extend halfway around, means securing each of said brackets to said columns whereby said brackets extend transversely therefrom, and shelf means detachably mounted between adjacent brackets.

6. A wardrobe rack unit especially adapted for permanent installation in a number of arrangements and comprising a plurality of spaced parallel base legs, there being a pair of spaced ears upstanding from the center of each base leg, a cross brace having spaced plates extending laterally and downwardly at each end thereof with said spaced plates being connected to said spaced ears to reinforce said spaced base legs, a vertical column upstanding from each pair of said spaced ears and connected thereto, means for bracing said vertical members by said cross brace, a bracket formed of relatively thin sheet material having one end thereof bent to conform closely to the contour of said column and to extend one-half of the way around when in position thereon, means securing a pair of brackets at the same vertical height to said column whereby said brackets extend in opposite directions transversely from said column and substantially parallel to said base legs, and shelf means detachably secured between brackets on both sides of said columns.

7. In a wardrobe rack unit, a pair of substantially parallel base members positioned upon a surface, a pair of spaced ears upstanding from each of said base members, vertical members having their lower ends secured between the spaced ears of each of said base members, a cross brace reinforcing said base members and having spaced plates extending outwardly and downwardly from each end thereof with said spaced plates receiving said vertical members therebetween and secured to said spaced ears, means for bracing said vertical members by said cross brace, bracket means secured to said vertical members, and shelf means connected between the bracket means mounted on said vertical members.

*8. In a wardrobe rack unit, base means positioned upon a surface, upstanding post means connected to said base means, bracket means secured to said upstanding post means at its uppermost section, shelf means carried by said bracket and providing a supporting surface for articles, said shelf comprising a plurality of openings spacedly arranged over the supporting surface, and said shelf having Z-shaped peripheral edges defining said openings to reinforce said shelf supporting surface.*

*9. In a wardrobe rack unit, base means positioned upon a surface, upstanding post means connected to said base means, bracket means secured to said upstanding post means at its uppermost section, said bracket being secured to said post means and extending transversely therefrom, shelf means carried by said bracket and providing a supporting surface for articles, said shelf comprising a plurality of openings spacedly arranged over the supporting surface, and said shelf having Z-shaped peripheral edges defining said openings to reinforce said shelf supporting surface.*

*10. In a wardrobe rack unit, a pair of substantially parallel base members positioned upon a surface, a pair of spaced ears upstanding from each of said base members, vertical members having their lower ends secured between the spaced ears of each of said base members, a cross brace reinforcing said base members and having spaced plates extending outwardly and downwardly from each end thereof with said spaced plates receiving said vertical members therebetween and secured to said spaced ears, means for bracing said vertical members by said cross brace, bracket means secured to said vertical members, and shelf means connected between the bracket means mounted on said vertical members, said shelf comprising a plurality of openings therein, and said shelf having Z-shaped peripheral edges defining said openings for reinforcing said shelf.*

References Cited in the file of this patent or the original patent

UNITED STATES PATENTS

| | | |
|---|---|---|
| 744,149 | Wilton | Nov. 17, 1903 |
| 1,302,652 | Gilbert | May 6, 1919 |
| 1,654,183 | Mayer | Dec. 27, 1927 |
| 1,830,282 | Lorch | Nov. 3, 1931 |
| 1,853,840 | Bailey | Apr. 12, 1932 |
| 1,940,584 | Saussure | Dec. 19, 1933 |
| 1,966,561 | Ball | Apr. 2, 1935 |
| 2,247,436 | Erickson | July 1, 1941 |
| 2,309,465 | Magnuson | Jan. 26, 1943 |
| 2,329,815 | Attwood | Sept. 21, 1943 |
| 2,502,037 | Erikainen | Mar. 28, 1950 |
| 2,611,160 | Hanesse | Sept. 23, 1952 |

FOREIGN PATENTS

| | | |
|---|---|---|
| 580,052 | Great Britain | Aug. 26, 1946 |
| 826,354 | France | Jan. 4, 1938 |